United States Patent Office 3,508,185
Patented Apr. 21, 1970

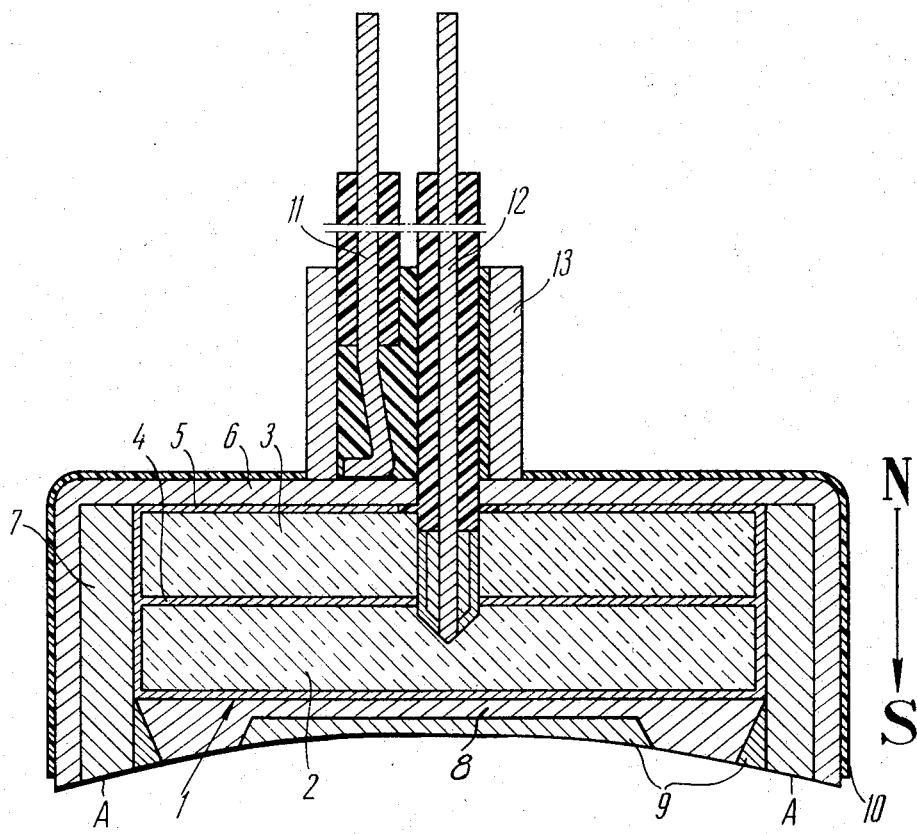

3,508,185
THERMISTOR FOR MEASURING SURFACE TEMPERATURE
Leonid Naumovich Tulchinsky, Ulitsa Kominterna 20, kv. 4, Kiev, U.S.S.R.
Filed May 25, 1967, Ser. No. 641,319
Int. Cl. H01c 7/04
U.S. Cl. 338—22                                7 Claims

ABSTRACT OF THE DISCLOSURE

A thermistor for measuring the surface temperature of ferromagnetic bodies and thin envelopes made of a non-magnetic material which, in order to provide a good thermal contact of the sensitive element with the surface under check without outer pressure or being mechanically attached thereto and without affecting adversely the properties of that surface, comprises a permanent magnet used as a sensitive element, retained on the surface under check by the magnetic attactive force and made of a magnetically hard ferrite magnetized during manufacturing thereof; metal electrodes used to supply current to said sensitive element, the current allowing to measure the sensitive element resistance depending on the temperature of the surface under check; terminals used to connect the thermistor to a measuring circuit; and a thermal-insulating coat insulating the thermistor from the ambient medium.

---

This invention relates to temperature measurement by means of electric thermometers and, in particular, thermistors used, for example, in measuring the surface temperature of ferromagnetic (steel, nickel, etc.) bodies and thin envelopes made of non-magnetic material.

The known thermistors employed for measuring surface temperature are made as washers or disks which are cemented or pasted onto the surface being measured (cf. "Thermal resistors," ed. by Sotskov, Moscow 1958) or are soldered onto it (cf. "Resistance Thermometry" by K. M. Greenland, Part B—Control).

A substantial disadvantage inherent in the conventional thermistors resides in that the surface of the object under test undergoes irreversible changes during cementing or soldering and the concurrent processes, and in that a thermistor once attached in the aforesaid manner cannot be detached subsequently.

The invention has as an object the elimination of the above-mentioned disadvantages and the provision of a thermistor which enables good thermal contact of the sensitive element with the surface under check without being mechanically attached thereto and without affecting adversely the properties of that surface.

According to the invention, the above and other objects are accomplished due to the fact that the sensitive element of the thermistor is made of retentive ferrite, in particular, of barium ferrite magnetized during manufacture of the latter. Thus, the sensitive element is essentially a permanent magnet.

The sensitive element can be placed inside a casing made of a non-retentive metal and separated from the lateral surface of said sensitive element with a non-permeable gap.

A gasket made of a diamagnetic material possessing high thermoconductivity factor, in particular copper or silver, can be placed into said gap to decrease the dispersion of the magnetic flux and to supply a heat flow to the side surface of the sensitive element.

The surface of the thermistor that is intended to be in thermal contact with the obpject under test, is preferably shaped so as to suit the shape of the surface being checked, in particular: convex, concave, plane or any other.

Given below is a description of an exemplary embodiment of the invention with due reference to the accompanying drawing, wherein an axial elevation of a thermistor for measuring the temperature of the external surface of a cylindrical body is represented.

The device of the present invention comprises a sensitive element 1 composed of two disks 2 and 3 made of magnetized barium ferrite, and an inner silver electrode 4 and an outer silver electrode 5.

The sensitive element 1 is placed into a cylindrical casing 6 made of a non-retentive metallic material and is separated from the lateral walls of the casing by a cylindrical gasket 7 made of a high-thermoconductivity diamagnetic material which is, in the specific and preferred embodiment, of copper.

One of the end faces of the sensitive element 1 is connected directly to the casing 6, while the other end face is covered with a bottompiece 8 made of soft iron, whose depressions are coated with a metal layer 9.

The casing is coated with a thermal-insulating layer 10. The outer electrode 5 is in direct contact with the casing 6 to which the terminal 11 is welded. The terminal 12 is welded to electrode 4. The thermistor is connected to a measuring circuit (not shown) through the terminals 11 and 12. A cylinder 13 welded onto the casing is filled with enamel to make the thermistor airtight and fix the terminals in position.

The arrow NS indicates the direction of magnetization of the sensitive element.

The thermistor functions as follows. When the effective area AA comes in contact with a ferromagnetic surface or a thin non-magnetic envelope and if a magnetic piece of a corresponding shape is placed on the other side of the test surface, a magnetic attractive force arises which retains the thermistor on the surface being tested and contributes to a good thermal contact therebetween.

A heat flow is supplied through the casing 6 and the diamagnetic gasket 7 to the upper end face and the lateral surface of the sensitive element 1, and through the bottom-piece 8 of the casing, to the lower surface thereof, whereby a uniform heating of the sensitive element and relatively fast response of the thermistor are attained. Apart from this, the sensitive element 1, the casing 6, the bottom piece 8 and the object under test (or an auxiliary piece when measuring temperature of thin envelopes) constitute a closed magnetic circuit which makes it possible to avoid losses in the magnetic flux, thus resulting in a stronger attractive force with which the thermistor is held to the surface under test.

Besides, the casing protects the sensitive element from being affected by the surrounding medium.

In the specific and preferred embodiment of the present invention, use is made, as the material for the sensitive element, of barium ferrite which possesses coercive force as high as 2000 a./cm. which allows permanent magnets to be manufactured from that material in the form of thin disks, washers or plates.

Since the magnetic transition temperature (Curie point) of barium ferrite is 450° C., the present thermistor can be undoubtedly employed at temperatures of the order of up to 350° C.

When used at higher temperatures above the Curie point, the thermistor is demagnetized, but after having been remagnetized it completely restores its properties.

As the semi-conductor material, barium ferrite is distinguished for its high thermal stability at temperatures of up to 1000° C. and high temperature coefficient of electric conductivity which makes it possible to make from that material a thermistor possessing the temperature coefficient of 4-7% per degree of centigrade when used at room temperatures.

The present invention can be effectively used in checking the surface temperature of parts and components of various machines, electric motors, transformers, elements of electronic apparatus and equipment, reactors, and the like.

What I claim is:

1. A thermistor for measuring the surface temperature of ferromagnetic bodies and thin envelopes made of a non-magnetic material, comprising a sensitive element effectively constituting a permanent magnet adapted for being retained on the said surface by magnetic attractive force, said element being of a magnetically hard and magnetized barium ferrite; metal electrodes to supply current to said sensitive element, the current allowing to measure the sensitive element resistance depending on the temperature of the said surface; terminals to connect the thermistor to a measuring circuit; and a thermal-insulating coating insulating the thermistor.

2. A thermistor for measuring the surface temperature of ferromagnetic bodies and thin envelopes made of a non-magnetic material, comprising a sensitive element effectively constituting a permanent magnet and of a magnetically hard and magnetized ferrite: a casing housing said sensitive element and of a magnetically soft metallic material and supplying the magnetic flux of the permanent magnet through the operating surface of the thermistor to the said surface to retain thereon the thermistor due to the magnetic attractive force; a non-magnetic gap being provided between the casing and the side face of the sensitive element; metal electrodes to supply current to said sensitive element, tha current allowing to measure the sensitive element resistance depending on the temperature of the first said surface; terminals to connect the thermistor to a measuring circuit; and a thermal-insulating coat insulating the thermistor from ambient conditions.

3. A thermistor as claimed in claim 2, in which the magnetically hard ferrite is barium ferrite.

4. A thermistor as claimed in claim 2, in which the operating surface adapted to contact the first said surface has a shape corresponding to that of the first said surface.

5. A thermistor as claimed in claim 2 comprising a gasket of a diamagnetic material possessing a high thermo-conductivity factor, said gasket being placed in said non-magnetic gap to decrease the dispersion of the magnetic flux and to supply a heat flow to the side face of the sensitive element and effectively constituting a component of the hermetically-sealed casing thus formed.

6. A thermistor as claimed in claim 5, in which said diamagnetic gasket is of copper.

7. A thermistor as claimed in claim 5, in which said operating surface has a shape corresponding to that of the first said surface.

References Cited

UNITED STATES PATENTS

| | | | |
|---|---|---|---|
| 2,779,810 | 1/1957 | Horbinski | 73—359 X |
| 3,008,331 | 11/1961 | Chase. | |
| 2,120,374 | 6/1938 | Ruben | 338—30 |
| 2,728,836 | 12/1955 | De Boisblanc et al. | 338—30 |
| 3,266,001 | 8/1966 | Landis et al. | |
| 3,267,733 | 8/1966 | Chambers. | |

OTHER REFERENCES

Netherlands published application Octrooiaanvrage No. 298,359, November 1965. (Sheet 1 and pp. 1 to 9).

Philips Technical Review, vol. 13, No. 7, 1951/52, pp. 194, 195, 196, 197, 202, 203.

REUBEN EPSTEIN, Primary Examiner

U.S. Cl. X.R.

73—362; 338—25